Patented Aug. 26, 1941

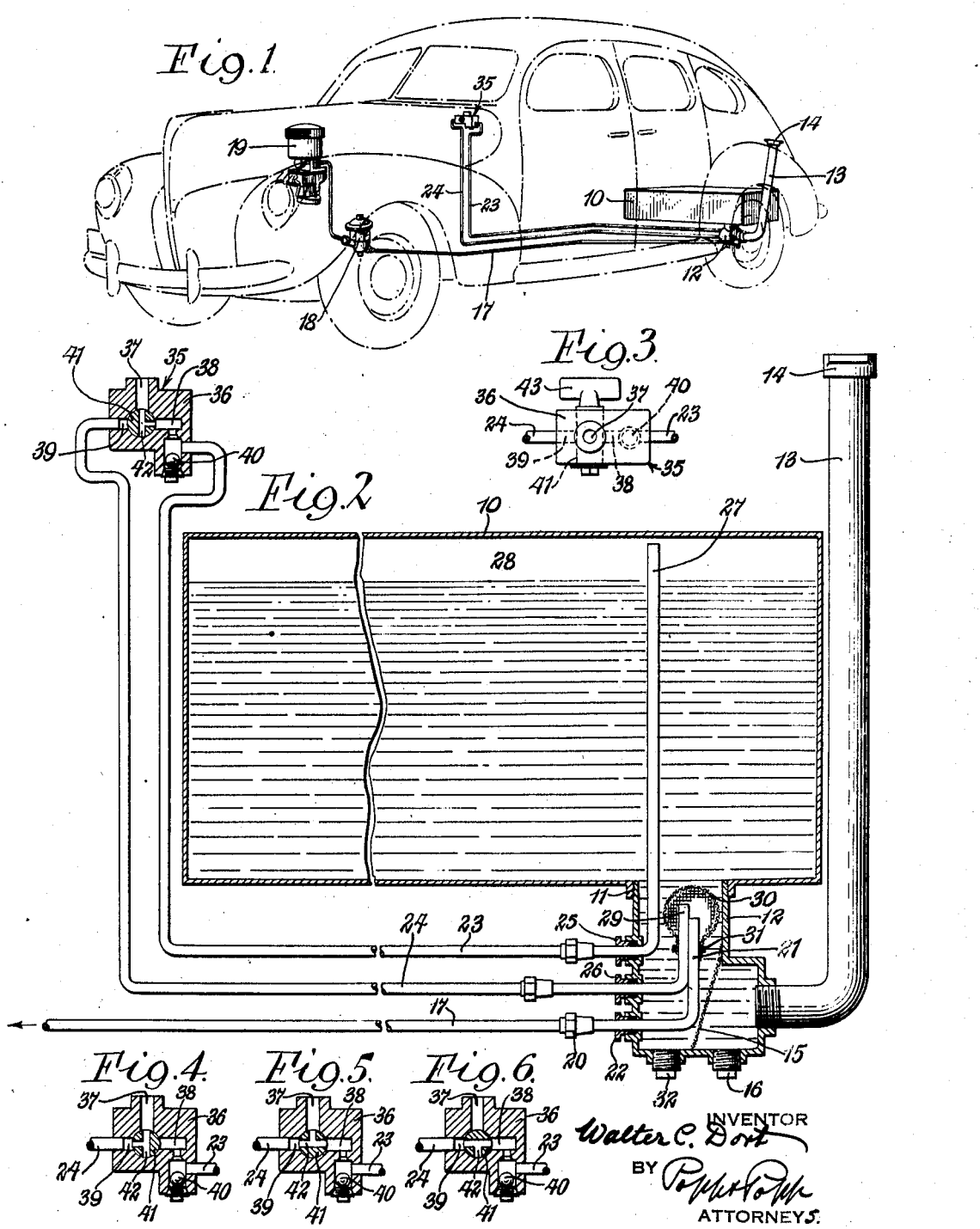

2,253,509

UNITED STATES PATENT OFFICE 2,253,509

CLEANING DEVICE FOR LIQUID SUPPLY TANKS

Walter C. Dort, Buffalo, N. Y.

Application May 8, 1940, Serial No. 334,079

15 Claims. (Cl. 210—150)

This invention relates to a cleaning device for liquid supply tanks and more particularly to such a cleaning device associated with the fuel supply tank of an automobile or motor boat.

It is a matter of general knowledge that the gasoline line leading from the gasoline supply tank to the motor of an automobile at times becomes clogged with lint, dirt, foreign matter and the like resulting in the impairment of the operation and performance of the motor and it is to the elimination of this undesirable condition that the present invention is directed.

It is therefore the principal object of the present invention to provide such a cleaning device in combination with the fuel supply tank of an automobile and which filters the fuel supplied to the motor so that no foreign matter will lodge in the fuel feed line leading to the motor.

Another object of the invention is to provide such a cleaning device which is simple and compact in form and which can be secured as a unit to the gasoline supply tank of the automobile.

Another object of the invention is to provide such a cleaning device in which the dirt and foreign matter are collected on a screen which can be purged by air admitted under atmospheric pressure.

Another object of the invention is to provide such a cleaning device in which the gasoline is filtered twice through two screens, the dirt and foreign matter collected below each screen being removable through plug openings in the bottom of a housing which is secured to the underside of the supply tank to provide a sump for the tank.

Another object of the invention is to provide such a cleaning device in which air under atmospheric pressure can be admitted through an air line, the end of which is arranged under a screen which surrounds it and which also surrounds the end of the gasoline feed line leading to the engine of the automobile, the admission of air through this air line being regulated by a control valve conveniently arranged under the dashboard and readily accessible by the operator. The admission of air through this air line effects a cleaning or purging of the screen.

A further object of the invention is to provide such a cleaning device in which the control valve can be readily adjusted to different positions by the operator of the automobile, each position of the control valve determining a different operation of the cleaning device.

A further aim of the invention is to provide such a cleaning device in which the control valve can be adjusted to a position to prevent any admission of air to the chamber formed in the supply tank above the level of gasoline in the tank and hence, in effect, lock the motor or prevent anyone from siphoning gasoline from the tank because of the partial vacuum formed in the chamber.

Another object of the invention is to provide such a cleaning device in which a check valve prevents any draining of the gasoline from the tank in case the automobile overturns.

Another object of the invention is to provide such a cleaning device which functions uniformly throughout the entire tank capacity for a given setting of the air control valve, the setting and adjustment of the valve being under the control of the operator.

A further object of the invention is to provide such a cleaning device in combination with a hermetically sealed tank in which only a sufficient amount of moisture laden air from the atmosphere to permit the cleaning device to function is admitted through the air lines leading to the interior of the tank, thereby to eliminate the condensation of excessive amounts of moisture in the tank.

Another object of the invention is to provide such a cleaning device in which the end of the fuel feed line leading to the engine of the automobile is surrounded by a screen which is of such a fine mesh that any water in the tank is restrained from passing through the screen and entering the feed line to freeze and block the same during low temperatures.

In the accompanying drawing:

Fig. 1 is a perspective view of an automobile equipped with a device embodying my invention for cleaning the gasoline supply tank.

Fig. 2 is a sectional view of the various elements of the device.

Fig. 3 is a top plan view of the control valve which regulates the admission of air under atmospheric pressure to the gasoline supply tank.

Figs. 4, 5 and 6 are sectional views of the control valve shown in Fig. 2 and illustrating the various positions of the valve.

While I have illustrated my invention in the drawing in combination with an automobile gasoline tank, it is to be understood that my invention is applicable to other similar liquid supply systems in which liquid is withdrawn from a supply tank through a liquid feed line.

In its general organization my invention provides a cleaning device having two air lines leading to the interior of the gasoline supply tank and having their opposite and external ends connected by a control valve which can be adjusted to regulate the admission of air under atmospheric pressure through either one or the other, or both of the air lines, the end of one air line preferably extending above the level of the gasoline in the tank to admit air directly to the chamber above the gasoline in the tank and/or indirectly to the chamber above the gasoline through the body of gasoline through the other air line which terminates in the body of gasoline. This latter short air line is surrounded, together with the gasoline feed line leading to the engine of the automobile, by a screen which serves to prevent any dirt or foreign matter from entering the feed line. This screen can be purged of the dirt and foreign matter collected thereon by adjusting the control valve which connects the two air lines leading to the interior of the tank, thereby to regulate the admission of air through the short air line, the air collecting on the underside of the screen in the form of small bubbles which build up in number until they combine to form one or more large bubbles which rapidly rise to the surface of the gasoline in the tank. It is the combining of the many small bubbles to form the few large bubbles and their consequent rapid ascension through the interstices of the screen which effects a purging or cleaning of the screen by knocking or blowing the dirt and other foreign matter from the screen. This bubble action is pulsating in nature.

Referring now to the drawing, the gasoline supply tank 10 is provided with an internally threaded opening 11 in its bottom which is adapted to receive the externally threaded end of a L-shaped housing 12 which provides a sump for the tank, the horizontal portion of this housing being formed to receive the end of a gasoline filling pipe 13 the upper and external end of which is covered by an airtight cap 14. When it is desired to fill the tank 10 the cap 14 is removed and gasoline enters through the filling pipe 13 into the sump housing 12, the gasoline being filtered through a screen 15 which is arranged at an angle in the lower part of the housing 12 and which extends the full width of the housing and is suitably secured to the same. This angular arrangement of the screen 15 provides a larger screening area than it would if the screen were vertically arranged in the horizontal portion of the housing and also permits the dirt and foreign matter restrained from passing through the screen to drop off the screen and collect on the bottom of the housing. The dirt and foreign matter can be removed through an opening provided in the bottom of the housing 12 by removing the plug 16.

A gasoline feed line 17 leads from the interior of the sump to the fuel pump 18 which pumps gasoline through this line from the gasoline supply talk to the carburetor 19 of the engine. The feed line 17 is connected by means of a union 20 to a short section of line which extends through the wall of the housing 12 and has an upstanding portion 21 which preferably terminates short of the bottom level of the tank 10. A stuffing box 22 or other suitable sealing means seals the line 21 with the wall of the housing.

The wall of the housing 12 is also provided with two openings, each of which is adapted to receive one of the air lines 23 and 24, a suitable leak-proof seal being maintained by stuffing boxes 25 and 26. The air line 23 is provided with an upstanding portion 27, the upper end of which preferably extends to a point above the level of the gasoline in the tank. This permits of admitting air through the line portion 27 directly to the air chamber 28 provided above the level of the gasoline in the tank.

The air line 24 is also provided with an upstanding portion 29 which preferably extends to a point a short distance above the upper end of the gasoline line portion 21. It will therefore be seen that the air line 24 terminates at a point within the body of the gasoline in the tank 10. The upper ends of the air line portion 29 and the gasoline line portion 21 are preferably covered or surrounded by a mantle-shaped screen 30 which is secured to these lines in any suitable manner, the specific securing means shown comprising a few twistings of wire 31 around the lower edge of the screen 30. Any dirt or foreign matter falling off the screen 30 and settling to the bottom of the sump can be removed through an opening provided in the bottom of the housing 12, this opening being normally closed by a plug 32.

It is to be noted that the screen 30 is of such a fine mesh that any water in the tank is restrained from passing through the screen and entering the feed line portion 21. This prevents the collection of water in the fuel feed line 17 and eliminates the possibility of water freezing and blocking the feed line during low temperatures.

To regulate the admission of air from the atmosphere under atmospheric pressure, through the air line 23 and/or the air line 24, to the interior of the gasoline tank 10 to replace the volume of gasoline withdrawn from the tank through the gasoline feed line 17, air control valve means are provided between the external ends of these air lines, which means are preferably constructed as follows:

The control valve generally indicated by the numeral 35 is preferably arranged under the dashboard of the automobile where it is readily accessible to the operator, as shown in Fig. 1. The control valve comprises a housing member 36 which is provided with communicating passageways 37, 38 and 39, the passageway 37 being directly exposed to the atmosphere and the passageways 38 and 39, respectively, being connected to the ends of the air lines 23 and 24. A ball check valve 40 is arranged in the housing member 36 and is interposed in the passageway 38. While the housing member 36 remains in the upright position shown in Fig. 2, the ball 40 does not obstruct the passageway 38, but if the automobile should overturn the ball 40 will fall by gravity to its seat thereby shutting off the passageway 38 and preventing any gasoline from draining out of the tank 10 through the line 23.

The housing member 36 is internally formed to receive a valve head 41 which is rotatably mounted in the housing member, the valve head 41 being provided with a T-shaped passageway 42. It will therefore be seen that this construction provides a three-way valve having three branch passageways. One end of the valve head 41 is provided with a handle 43 by which the valve head can be rotated in the housing member.

Assuming that gasoline is continuously being withdrawn from the tank through the gasoline feed line 17 and fed to the motor the volume of gasoline so withdrawn must be replaced by a corresponding volume of air in order to prevent the formation of a partial vacuum in the chamber 28 above the level of the gasoline in the tank. With reference to the position of the valve head 41, as shown in Fig. 2, which position I prefer to call the "priming" position, it will be noted that air under atmospheric pressure can only enter the tank 10 through the passageway 37, the unobstructed branches of the passageway 42, the passageway 38, the air line 23, and thence up through the upstanding line portion 27, thereby to admit air directly to the chamber 28 above the level of the gasoline in the tank. The volume of air so admitted depends upon the volume of gasoline withdrawn. It is also to be noted that when the tank is being filled the valve must be set in the "priming" position inasmuch as it is only in this position of the valve that air in the chamber 28 above the level of the gasoline in the tank can be exhausted to be replaced by the incoming gasoline, the air being exhausted through the air line 27, through the valve 35 to the atmosphere.

Assuming that the gasoline is being withdrawn through the feed line 17 and further assuming that the screen 30 is so clogged with dirt and foreign matter as to hinder the proper feeding of gasoline through the feed line 17, the valve head 41 can be turned to the position shown in Fig. 4 which I prefer to term the "purging" position. In this position of the valve no air can be admitted through the air line 24. Thus, air will pass through the passageway 37, the unobstructed branches of the passageway 42, the passageway 39, the line 24, and up through the short upstanding line portion 29 thereby to discharge air directly into the body of the gasoline in the tank. It will be noted that the upper end of the line 29 extends upwardly a short distance above the upper end of the gasoline line 21. This arrangement of the lines 29 and 31 prevents any possibility of air admitted through the end of the line 29 from being sucked directly into the end of the gasoline feed line 21 since the air admitted through the line 29 tends to ascend to the surface of the gasoline in the tank. The volume of air so admitted through the line 29, of course, depends upon the volume of gasoline withdrawn from the tank 10. The air discharged by the line 29 collects in the form of small bubbles on the underside of the screen 30 until a sufficient number have collected whereupon they combine to form a few large bubbles which pass through the screen and rise immediately to the surface of the gasoline. The combining of the many small bubbles to form the few large bubbles is vigorous and knocks the dirt and foreign matter off the screen 30 as these large bubbles rapidly pass through the interstices of the screen. This is what I term the "purging" action and since an interval of time must elapse for the small bubbles to collect and form the few large bubbles it will be noted that the "purging" action is pulsating in nature. This action is very effective in cleaning any dirt or the like from the screen 30. It will further be noted that the dirt collects on the external surface of the screen and hence cannot enter the gasoline feed line 21.

If the operator desires to admit air through both of the lines 23 and 24 he merely turns the valve head 41 to the position shown in Fig. 5 whereby air is divided by the T-shaped passageway 42 to pass through both of the air lines 23 and 24. I prefer to call this position of the valve the "manifolding" position which really permits of a combination of the "priming" and "purging" actions previously discussed.

In the "locked" position of the valve shown in Fig. 6, the inner end of the passageway 37 is blocked by the valve head 41 thereby inhibiting the admission of any air to the tank 10 through either of the air lines 23 and 24. Since no air can be admitted to the tank no gasoline can be withdrawn from the tank. Any attempt to withdraw gasoline from the tank with the valve in this position tends to create a partial vacuum in the chamber 28 above the level of the gasoline. It will therefore be seen that the position of the valve, as shown in Fig. 6, effects a "locked" condition of the motor since it can receive no gasoline from the supply tank. It will also be noted that gasoline cannot be siphoned out of the tank through the filling pipe 13 since no air can be admitted to the chamber 28 above the level of the gasoline in the tank.

From the foregoing it will be seen that the present invention provides a simple and low cost cleaning device which may be secured as a unit to the gasoline supply tank of an automobile and which includes a control valve adjustable by the operator to a number of positions thereby to regulate the admission of air under atmospheric pressure to the supply tank either directly to the chamber above the level of the gasoline in the tank and/or indirectly through the body of the gasoline, a cleaning or purging of the screen surrounding the intake end of the gasoline feed line being effected when the air is admitted through the body of the gasoline. It will also be noted that no water can enter the fuel feed line to freeze and block the same during low temperatures. Further, it will be seen that the control valve can be adjusted to a position to effect a "locked" condition of the motor in which position no gasoline can be withdrawn from the supply tank. It will also be appreciated that any suitable form of key operated mechanism (not shown) can be provided for mechanically locking the control valve in its locked position to prevent theft of the automobile.

I claim as my invention:

1. The combination with a hermetically sealed liquid supply tank having a liquid feed line, of an air line leading to the interior of said tank, a second air line leading to the interior of said tank and terminating in the body of liquid in said tank, filtering means covering the ends of said feed line and said second air line, and means connecting the external ends of said air lines to regulate the admission of air through said air lines.

2. The combination with a hermetically sealed liquid supply tank having a liquid feed line connected thereto, of an air line leading to the interior of said tank, a second air line leading to the interior of said tank and terminating in the body of liquid in said tank, a single filtering means covering the ends of said feed line and said second air line, and means connecting the external ends of said air lines to regulate the admission of air under atmospheric pressure through said air lines.

3. The combination with a hermetically sealed liquid supply tank having a liquid feed line connected thereto, of an air line leading to the interior of said tank, a second air line leading to the interior of said tank and terminating in the body of liquid in said tank, a screen covering the ends of said feed line and said second air line, and means connecting the external ends of said air lines to regulate the admission of air under atmospheric pressure through said air lines.

4. The combination with a hermetically sealed liquid supply tank having a liquid feed line connected thereto, of an air line leading to the interior of said tank, a second air line leading to the interior of said tank and terminating in the body of liquid in said tank, a single filtering means covering the ends of said feed line and said second air line, and a control valve connecting the external ends of said air lines to regulate the admission of air through said air lines.

5. The combination with a hermetically sealed liquid supply tank having an opening therein, of a housing secured to said opening to provide a sump, a liquid feed line connected with said housing and leading to the interior of said sump, an air line connected with said housing and leading to the interior of said tank, a second air line connected with said housing and leading to the interior of said sump, a single filtering means covering the ends of said feed line and said second air line, and means connecting the external ends of said air lines to regulate the admission of air through said air lines.

6. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, a screen covering the ends of said feed line and said second air line, and a control valve connecting the external ends of said air lines to regulate the admission of air through said air lines.

7. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, said second air line being arranged adjacent said feed line and extending a short distance above said feed line, a screen covering the ends of said feed line and said second air line, and a manually adjustable valve connecting the external ends of said air lines to regulate the admission of air under atmospheric pressure through said air lines.

8. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, a screen covering the ends of said feed line and said second air line, means for removing the screened off material collected in the bottom of said sump, and a control valve connecting the external ends of said air lines to regulate the admission of air through said air lines.

9. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, said second air line being arranged adjacent said feed line and extending a short distance above said feed line, a screen covering the ends of said feed line and said second air line, a plug arranged in an opening provided in the bottom of said housing through which opening the screened off material collected on the bottom of said housing can be removed, and a control valve connecting the external ends of said air lines to regulate the admission of air through said air lines.

10. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, a single filtering means covering the ends of said feed line and said second air line, a filling pipe communicating with said tank, means for hermetically closing off said filling pipe, and means connecting the external ends of said air lines to regulate the admission of air through said air lines.

11. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, a single filtering means covering the ends of said feed line and said second air line, a filling pipe connected to said housing and communicating with said sump, a removable cap arranged on the external end of said filling pipe, filter means arranged in said housing and in front of said filling pipe, and means connecting the external ends of said air lines to regulate the admission of air through said air lines.

12. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, a single filtering means covering the ends of said feed line and said second air line, a filling pipe connected to said housing and communicating with said sump, a removable cap arranged on the external end of said filling pipe, a screen arranged in said housing and in front of said filling pipe, a plug arranged in an opening provided in the bottom of said housing through which opening the screened off material collected on the bottom of said housing can be removed, said opening and said plug being arranged immediately adjacent said screen and on the inlet side thereof, and means connecting the external ends of said air lines to regulate the admission of air through said air lines.

13. The combination with a hermetically sealed liquid supply tank having an opening in the bottom thereof, of a housing secured to said opening to provide a sump, a liquid feed line connected with said housing and leading to the interior of said sump, an air line connected with said housing and leading to the interior of said tank, a second air line connected with said housing and leading to the interior of said sump, said second air line being arranged adjacent said feed line and extending a short distance above said feed line, a screen covering the ends of said feed line and said second air line, a plug arranged in an opening provided in the bottom of said housing through which opening the screened off material collected on the bottom of said housing can be removed, a filling pipe connected to said housing and communicating with said sump, a removable cap arranged on the external end of said filling pipe, a screen arranged in said housing and in front of said filling pipe, a plug arranged in an opening provided in the bottom of said housing through which opening the material screened off by said last mentioned screen can be removed, said last mentioned opening and plug being arranged immediately adjacent said last mentioned screen and on the inlet side thereof, and means connecting the external ends of said air lines to regulate the admission of air through said air lines.

14. The combination with a hermetically sealed liquid supply tank having a liquid feed line connected thereto, of an air line leading to the interior of said tank, a second air line leading to the interior of said tank and terminating in the body of liquid in said tank, filtering means covering the ends of said feed line and said second air line, means connecting the external ends of said air lines to regulate the admission of air under atmospheric pressure through said air lines, and a check valve arranged in said air line to prevent the flow of liquid from said air line when said tank is inverted.

15. The combination with a hermetically sealed fuel supply tank having a fuel feed line connected thereto, of an air line leading to the interior of said tank, a second air line leading to the interior of said tank and terminating in the body of fuel in said tank, filtering means covering the ends of said feed line and said second air line and permitting fuel to pass therethrough and restraining any water in said fuel from passing therethrough, and means connecting the external ends of said air lines to regulate the admission of air through said air lines.

WALTER C. DORT.